(No Model.)
W. W. ALEXANDER & M. C. GILLHAM.
ELECTRIC SIGNAL FOR HIGHWAY CROSSINGS.
No. 577,635. Patented Feb. 23, 1897.
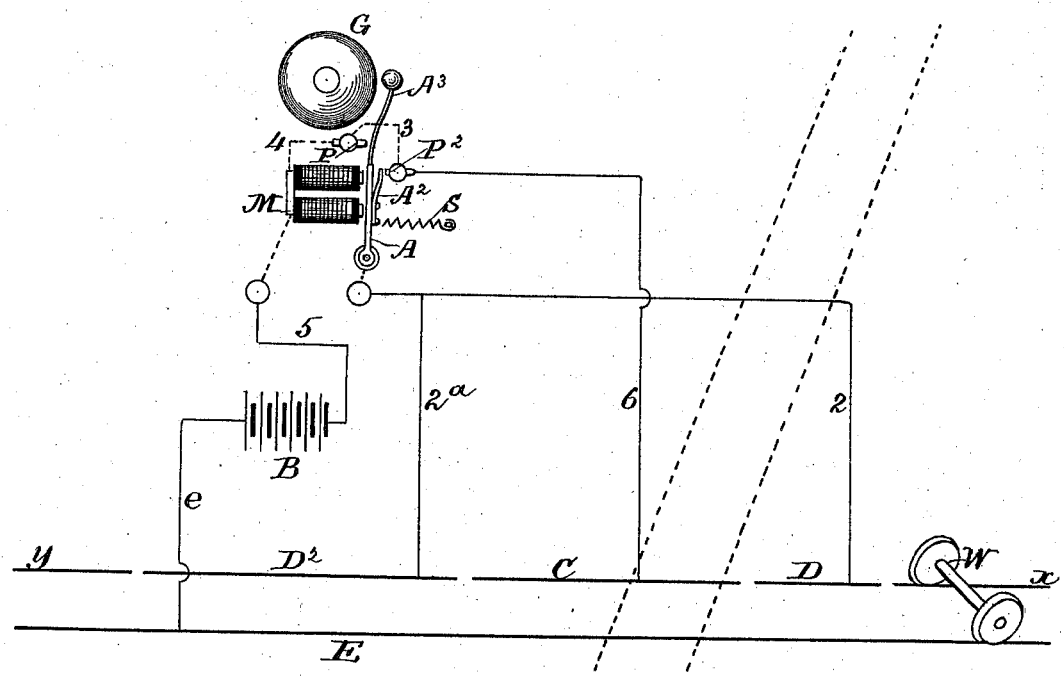
WITNESSES
A. B. Degges
L. D. Henrichs
INVENTORS
William W. Alexander
and Manceillia C. Gillham
by E. E. Masson, Attorney.

UNITED STATES PATENT OFFICE.

WILLIAM W. ALEXANDER AND MANCEILLIA C. GILLHAM, OF KANSAS CITY, MISSOURI.

ELECTRIC SIGNAL FOR HIGHWAY-CROSSINGS.

SPECIFICATION forming part of Letters Patent No. 577,635, dated February 23, 1897.

Application filed March 23, 1896. Serial No. 584,514. (No model.)

*To all whom it may concern:*

Be it known that we, WILLIAM W. ALEXANDER and MANCEILLIA C. GILLHAM, citizens of the United States, residing at Kansas City, in the county of Jackson and State of Missouri, have invented certain new and useful Improvements in Electric Signals for Highway-Crossings, of which the following is a specification, reference being had therein to the accompanying drawing.

Our invention relates to the employment of an electromagnet in connection with a battery, a railroad-rail at the crossing insulated from the rails at each end of said crossing, and other rails insulated from the latter, with suitable electric circuits to obtain danger-signals at railway-crossings, as will be hereinafter described.

The invention will first be described in connection with the drawing, and then be pointed out in the claims.

In said drawing the railway-track is shown as consisting of a substantially continuous rail E or a series of rails electrically connected end to end and a series of rails or sections of track-rails $D^2$ C D, insulated from each other, a highway H being shown crossing the track over the rail or section C which is intermediate of the sections D and $D^2$. Car-wheels united by a metal axle are shown on the track at W and may be regarded as a train of cars, and are used as electric conductors between the rail E and either one of the sections D C $D^2$ on which it may happen to travel.

The apparatus used to produce an audible signal consists of a battery B, an electromagnet M, its armature A, having a retractile spring S and provided with a spring extension $A^2$ in the rear thereof, and a hammer $A^3$, projecting from the end of the armature, a gong G for the hammer to strike against, suitable contact-points P and $P^2$ on opposite sides of the armature, and electric circuits suitably arranged, as will be described in connection with the operation.

When a train approaches the crossing H from the portion of the track marked $x$ and the wheels W strike against the insulated section of track D, the circuit is from battery B by wire $e$, track-rail E, car wheels and axle W, the insulated section of track D, wire 2, armature A, spring extension $A^2$ of said armature, contact-point $P^2$, wire 3, wire 4, electromagnet M, and wire 5 to battery B, thereby causing the hammer of the armature to vibrate against the gong G until the train or car wheels W pass from the insulated section of track D and strike the insulated section of track C. When this takes place, the circuit is from battery B by wire $e$, track-rail E, car wheels and axle W, insulated track C, wire 6, wire 3, wire 4, electromagnet M, and wire 5 to battery B, thereby establishing a continuous circuit through the electromagnet M, holding its armature A against the contact P and preventing further vibrations of the armature, and therefore preventing the ringing of the bell and its noise while the cars pass or are stationary upon the insulated track-section C.

When the cars pass from the insulated track-section C to the insulated track-section $D^2$, the circuit is from battery B by wire $e$, track-rail E, and wheels and axle W, insulated track-section $D^2$, wire $2^a$, armature A, contact P, wire 4, electromagnet M, and wire 5 to battery B, thereby continuing to hold the armature A against the contact P and preventing the vibration of the armature. When the wheels W, continuing to advance, pass from the insulated track-section $D^2$, the circuit is broken and the armature A is drawn to its normal position against the contact $P^2$ by reason of the retractile spring S having one end attached to said armature.

When the railroad-train advances in the opposite direction—viz., when the wheels W approach the highway from $y$, going to $x$, they first strike the insulated track-section $D^2$. The circuit is then from the battery B by wire $e$, track-rail E, car wheels and axle W, insulated track $D^2$, wire $2^a$, armature A, armature-spring extension $A^2$, contact $P^2$, wire 3, wire 4, electromagnet M, and wire 5 to battery, thereby causing the hammer of the armature A to vibrate against the gong G.

When the wheels reach and strike the insulated track-section C, the circuit is from battery B by wire $e$, track-rail E, car wheels and axle W, insulated track-section C, wire 6, wire 3, wire 4, electromagnet M, and wire 5 to battery, thereby establishing a continuous circuit through the electromagnet M, whereby the armature A is attracted and held against the contact P, thus preventing further vibrations and noise.

When the wheels strike the insulated track-section D, the circuit is from the battery B by wire e, track-rail E, car wheels and axle W, insulated track-section D, wire 2, armature A, contact P, wire 4, electromagnet M, and wire 5 to battery, thereby continuing to hold the armature A against the contact P and preventing its vibration while the wheels are upon the insulated track-section D. When the wheels pass from the insulated track-section D in the direction of the track marked $x$, the circuit just described is broken and the armature is pulled against the contact $P^2$ by the retractile spring S into its normal position.

The function of the magnet is three fold. The first action (when the train passes from $x$ to the insulated track D) closes the circuit through the magnet by the contact $P^2$, as described, and the magnet attracts its armature over against the contact-point P, breaking the circuit at $P^2$. Then the magnet discharges and the retractile spring pulls the armature back against the contact $P^2$, thereby again closing the circuit through magnet to be again broken. This action continues while the wheels are on the track-section D. The vibrating of the hammer of the armature against the gong warns passers upon the highway of the approaching train. When the armature is vibrating, as just now described, it strikes against the contact-point P, but the blow of the armature against the contact is so sudden that before a new circuit can be established through the contact P the rebound of the armature from the blow against the rigid contact and the pull of the retractile spring operates to prevent the making of a new route or path, and therefore the magnet continues on a vibrating circuit.

When the wheels pass to the insulated track C, it is desired that the vibrations of the armature against the bell should cease, and therefore when the wheels do pass to track C a new circuit is established, (by wires 3 and 4, as described,) and the armature is attracted by the magnet and held against the contact P, the circuit by contact $P^2$ being permanently broken. This makes a continuous circuit through the magnet and prevents any further vibrations of the armature or sounding of the gong. As the wheels pass to the insulated track $D^2$ the circuit is still through the magnet, but by way of wire $2^a$ and contact P and the armature, as described, continuing the holding of the armature until the wheels pass entirely from the insulated track $D^2$. The magnet is therefore first caused to be charged and discharged, causing rapid vibrations of its armature; second, is caused to give itself a new and continuous circuit, preventing further vibrations of its armature, and, third, is caused to take a third and continuous circuit to prevent the armature from vibrating except when the conditions are reversed.

While the drawing shows the magnet directly operating a gong, we do not confine ourselves to this particular form. The armature may be used as a circuit maker and breaker, as is well known, for electric bells, semaphores, signals, alarms, drops, switches, and circuit-closers.

Having now fully described our invention, we claim—

1. The combination of a railway-track having an electrically-continuous rail and a rail comprising sections insulated from each other, an electromagnet, its armature adapted to vibrate between two contact-points P and $P^2$, battery connections between the intermediate rail-section and the continuous rail and including the magnet and said contacts, and electrical connections between the armature and the other rail-sections substantially as described.

2. The combination of a railway-track having an electrically-continuous rail and a rail comprising sections insulated from each other, a vibrating bell having a contact-stop as $P^2$, a circuit therefor including a continuous rail, a battery, the bell-magnet, its armature, the contact, and one of the track-sections, and the branch wire leading from the contact to another track-section, whereby the bell is first rung and then stopped by the passage of a train over the rail-sections, substantially as described.

3. The combination of a railway-track having an electrically-continuous rail and a rail comprising sections insulated from each other, a battery, an electromagnet, its armature A, provided with a bell-hammer and having a spring extension $A^2$ on one side, a contact-point $P^2$ adjacent to said spring extension and a contact-point P on the opposite side to hold the circuit of the battery closed through the electromagnet, battery connections between the intermediate rail-section and the continuous rail and including the magnet and said contact-points, and electrical connections between the armature and the other rail-sections substantially as described.

In testimony whereof we affix our signatures in presence of two witnesses.

WILLIAM W. ALEXANDER.
MANCEILLIA C. GILLHAM.

Witnesses:
OTT J. SUTTER,
CHAS. RABER.